United States Patent
Brothers (10) Patent No.: US 9,042,048 B1
(45) Date of Patent: May 26, 2015

(54) LASER-IGNITED REACTIVE HAMR BONDING

(71) Applicant: Western Digital (Fremont), LLC, Fremont, CA (US)

(72) Inventor: Alan H. Brothers, Amphur Mueang (TH)

(73) Assignee: Western Digital (Fremont), LLC, Fremont, CA (US)

(*) Notice: Subject to any disclaimer, the term of this patent is extended or adjusted under 35 U.S.C. 154(b) by 0 days.

(21) Appl. No.: 14/503,042

(22) Filed: Sep. 30, 2014

(51) Int. Cl.
*G11B 5/02* (2006.01)
*G11B 5/48* (2006.01)
*B23K 31/02* (2006.01)
*B23K 1/00* (2006.01)
*G11B 5/00* (2006.01)

(52) U.S. Cl.
CPC .............. *G11B 5/4866* (2013.01); *B23K 31/02* (2013.01); *B23K 1/0006* (2013.01); *B23K 1/0016* (2013.01); *G11B 2005/0021* (2013.01)

(58) Field of Classification Search
CPC .............. G11B 2005/0021; G11B 2005/0005; G11B 5/314; G11B 5/3163; G11B 5/4813; G11B 25/043; G11B 5/6005
USPC ................... 360/59; 29/603.01, 737, 603.07, 29/603.03, 603.12; 369/13.13
See application file for complete search history.

(56) References Cited

U.S. PATENT DOCUMENTS

| 3,663,184 A | 5/1972 | Wood et al. |
|---|---|---|
| 4,158,084 A | 6/1979 | Prentice |
| 4,836,435 A | 6/1989 | Napp et al. |
| 4,947,238 A | 8/1990 | Ishii et al. |
| 5,197,654 A | 3/1993 | Katz et al. |
| 5,208,186 A | 5/1993 | Mathew |
| 5,381,944 A | 1/1995 | Makowiecki et al. |
| 5,538,795 A | 7/1996 | Barbee, Jr. et al. |
| 5,622,305 A | 4/1997 | Bacon et al. |
| 5,719,070 A | 2/1998 | Cook et al. |
| 5,770,821 A | 6/1998 | Hikasa et al. |
| 5,990,560 A | 11/1999 | Coult et al. |
| 6,016,949 A | 1/2000 | Slesinger |
| 6,075,673 A | 6/2000 | Wilde et al. |
| 6,097,575 A | 8/2000 | Trang et al. |
| 6,125,014 A | 9/2000 | Riedlin, Jr. |
| 6,125,015 A | 9/2000 | Carlson et al. |
| 6,130,863 A | 10/2000 | Wang et al. |
| 6,137,656 A | 10/2000 | Levi et al. |
| 6,144,528 A | 11/2000 | Anaya-Dufresne et al. |
| 6,147,838 A | 11/2000 | Chang et al. |
| 6,151,196 A | 11/2000 | Carlson et al. |

(Continued)

FOREIGN PATENT DOCUMENTS

DE     102009015502     10/2010

OTHER PUBLICATIONS

Lei Wang, et al., U.S. Appl. No. 13/664,271, filed Oct. 30, 2012, 28 pages.

(Continued)

*Primary Examiner* — Nabil Hindi (57) ABSTRACT

The present disclosure generally relates to a HAMR head and a method for fabrication thereof. The HAMR head has a write head with a waveguide extending therethrough. A laser diode is coupled to a submount that is bonded to the write head using an adhesion layer, a solder structure, and a self-propagating multilayer alloying stack.

20 Claims, 5 Drawing Sheets

(56) References Cited

U.S. PATENT DOCUMENTS

| | | |
|---|---|---|
| 6,178,064 B1 | 1/2001 | Chang et al. |
| 6,181,522 B1 | 1/2001 | Carlson |
| 6,181,673 B1 | 1/2001 | Wilde et al. |
| 6,229,672 B1 | 5/2001 | Lee et al. |
| 6,236,543 B1 | 5/2001 | Han et al. |
| 6,246,547 B1 | 6/2001 | Bozorgi et al. |
| 6,249,404 B1 | 6/2001 | Doundakov et al. |
| 6,250,541 B1 | 6/2001 | Shangguan et al. |
| 6,330,131 B1 | 12/2001 | Nepela et al. |
| 6,339,518 B1 | 1/2002 | Chang et al. |
| 6,349,017 B1 | 2/2002 | Schott |
| 6,373,660 B1 | 4/2002 | Lam et al. |
| 6,378,195 B1 | 4/2002 | Carlson |
| 6,391,770 B2 | 5/2002 | Kosaki et al. |
| 6,522,504 B1 | 2/2003 | Casey |
| 6,538,850 B1 | 3/2003 | Hadian et al. |
| 6,548,317 B2 | 4/2003 | Taniguchi et al. |
| 6,548,831 B1 | 4/2003 | Tokuhiro et al. |
| 6,583,019 B2 | 6/2003 | Vandermeulen et al. |
| 6,583,953 B1 | 6/2003 | Han et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,740,822 B2 | 5/2004 | Watanabe |
| 6,744,599 B1 | 6/2004 | Peng et al. |
| 6,762,123 B2 | 7/2004 | Curro et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,838,689 B1 | 1/2005 | Deng et al. |
| 6,856,489 B2 | 2/2005 | Hawwa et al. |
| 6,858,871 B2 | 2/2005 | Okada |
| 6,873,496 B1 | 3/2005 | Sun et al. |
| 6,912,103 B1 | 6/2005 | Peng et al. |
| 6,930,389 B2 | 8/2005 | Huang |
| 6,937,439 B1 | 8/2005 | Chang et al. |
| 6,956,718 B1 | 10/2005 | Kulkarni et al. |
| 6,972,930 B1 | 12/2005 | Tang et al. |
| 6,991,855 B2 | 1/2006 | Weihs et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,168,608 B2 | 1/2007 | Mei |
| 7,174,622 B2 | 2/2007 | Meyer et al. |
| 7,196,356 B2 | 3/2007 | Ishii et al. |
| 7,223,617 B2 | 5/2007 | Mochida et al. |
| 7,245,014 B2 | 7/2007 | Kurita et al. |
| 7,276,386 B2 | 10/2007 | Miyata et al. |
| 7,276,740 B2 | 10/2007 | Kim et al. |
| 7,289,299 B1 | 10/2007 | Sun et al. |
| 7,298,049 B2 | 11/2007 | Amoh et al. |
| 7,307,816 B1 | 12/2007 | Thornton et al. |
| 7,315,435 B1 | 1/2008 | Pan |
| 7,315,436 B1 | 1/2008 | Sanchez |
| 7,337,939 B2 | 3/2008 | Terada et al. |
| 7,361,412 B2 | 4/2008 | Wang et al. |
| 7,368,666 B2 | 5/2008 | Takeda |
| 7,372,142 B2 | 5/2008 | Ferrara et al. |
| 7,405,093 B2 | 7/2008 | Andrews |
| 7,414,814 B1 | 8/2008 | Pan |
| 7,436,631 B1 | 10/2008 | Fanslau, Jr. et al. |
| 7,449,905 B2 | 11/2008 | Shi et al. |
| 7,462,861 B2 | 12/2008 | Slater, Jr. et al. |
| 7,463,454 B2 | 12/2008 | Mastromatteo et al. |
| 7,474,508 B1 | 1/2009 | Li et al. |
| 7,477,486 B1 | 1/2009 | Sun et al. |
| 7,502,397 B2 | 3/2009 | Naganuma |
| 7,522,649 B2 | 4/2009 | Ha et al. |
| 7,548,673 B2 | 6/2009 | Azimi et al. |
| 7,593,190 B1 | 9/2009 | Thornton et al. |
| 7,595,963 B1 | 9/2009 | Chen et al. |
| 7,601,625 B2 | 10/2009 | Noritake et al. |
| 7,616,405 B2 | 11/2009 | Hu et al. |
| 7,724,791 B2 | 5/2010 | Stephens, IV |
| 7,729,089 B1 | 6/2010 | Hogan |
| 7,768,131 B1 | 8/2010 | Hsu et al. |
| 7,843,074 B2 | 11/2010 | Gao et al. |
| 7,921,436 B2 | 4/2011 | Shimizu et al. |
| 7,995,310 B1 | 8/2011 | Pan |
| 8,018,685 B2 | 9/2011 | Shimazawa et al. |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,220,140 B1 | 7/2012 | Wang et al. |
| 8,240,545 B1 | 8/2012 | Wang et al. |
| 8,254,212 B2 | 8/2012 | Snyder et al. |
| 8,256,272 B1 | 9/2012 | Roajanasiri et al. |
| 8,288,204 B1 | 10/2012 | Wang et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,299,630 B2 | 10/2012 | Braeuer et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,391,109 B2 | 3/2013 | Araki et al. |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,456,961 B1 | 6/2013 | Wang et al. |
| 8,462,462 B1 | 6/2013 | Moravec et al. |
| 8,477,459 B1 | 7/2013 | Pan |
| 8,477,570 B2 | 7/2013 | Arai et al. |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,590,138 B2 * | 11/2013 | Hara et al. ............... 29/603.01 |
| 8,593,764 B1 | 11/2013 | Tian et al. |
| 8,593,914 B2 | 11/2013 | Wang et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |

(56) References Cited

U.S. PATENT DOCUMENTS

| | | |
|---|---|---|
| 2004/0029304 A1 | 2/2004 | Naydenkov et al. |
| 2007/0015313 A1 | 1/2007 | Kwak et al. |
| 2007/0273025 A1 | 11/2007 | Bellaiche |
| 2009/0091024 A1 | 4/2009 | Zeng et al. |
| 2009/0207580 A1 | 8/2009 | Oshika et al. |
| 2009/0262448 A1 | 10/2009 | Shimazawa et al. |
| 2011/0114705 A1 | 5/2011 | Matis |
| 2011/0205860 A1 | 8/2011 | Chou et al. |
| 2012/0147717 A1 | 6/2012 | Shimazawa et al. |
| 2012/0163138 A1 | 6/2012 | Gage et al. |
| 2013/0016591 A1 | 1/2013 | Tomikawa et al. |
| 2013/0244541 A1 | 9/2013 | Yaemglin et al. |
| 2013/0293982 A1 | 11/2013 | Huber |

OTHER PUBLICATIONS

Chee Kheng Lim, U.S. Appl. No. 14/216,458, filed Mar. 17, 2014, 26 pages.

Alexander V. Demtchouk, et al., U.S. Appl. No. 14/051,397, filed Oct. 10, 2013, 18 pages.

Eric F. Schulte, et al., "Characterization of a Novel Fluxless Surface Preparation Process for Die Interconnect Bonding," SET North America, Sandia National Laboratory, pp. 1-5.

* cited by examiner

LASER-IGNITED REACTIVE HAMR BONDING

BACKGROUND

1. Field of the Disclosure

Embodiments of the present disclosure generally relate to a heat-assisted magnetic recording (HAMR) head and a method for manufacturing the HAMR head

2. Description of the Related Art

HAMR, sometimes referred to as thermally-assisted magnetic recording (TAMR or TAR) or energy assisted magnetic recording (EAMR), is a process whereby a localized area on the magnetic media is heated to a temperature above the Curie temperature, thereby lowering the effective coercivity of the localized region. The lowered coercivity permits writing within this heated region. The data state becomes "fixed" once the media cools below the Curie temperature.

HAMR heads typically have a light source, such as a laser diode, that delivers the light through a waveguide and a near field transducer (NFT) to focus the energy on a very specific location. The light source is disposed adjacent to the write head on a surface opposite the air bearing surface (ABS). The light source is coupled to a submount, which is mounted to the slider.

The submount is typically soldered to the slider. All the solder materials used for attaching the submount to the slider consist of metal films or film stacks that will alloy, melt, and wet the mating surfaces after being heated to the appropriate temperature during bonding (for brevity, this will be referred to simply as 'melting' the solder hereafter). In particular, solders are sought that will melt at low temperatures, so that: (a) the components can be heated quickly enough to enable high throughput in the soldering/bonding operation; and (b) the heating does not cause damage to either the slider or the submount.

Typically, heat is conducted to the solder through the slider body, for example by contact with a chuck that is heated electrically, or by a laser pointed at the chuck. Heat can also be conducted in through the submount, for example by directing a laser onto the submount. An additional proposal has been to heat the solder directly using a laser to whose wavelength the submount material is transparent. Alternatively, another proposal is to heat the solder using a pin probe that passes a small electrical current across the solder, or across an embedded thin film resistive heater embedded under the solder.

The above described existing technologies all share one common feature—the energy used for melting the solder is supplied in full from an external source, with none of the energy carried within the solder itself. As a consequence, the full energy supply for the bonding operation must be: (1) provided via some mechanism in the bonding apparatus which is not itself required for bonding; and (2) delivered through one or both of the submount and slider, in order to perform bonding.

The speed of the bonding operation is affected by how quickly the energy can be transferred. In the case of conduction through the submount or slider, the heat flux is described by Fick's Laws, in which the flux of heat is directly proportional to the temperature gradient between the bonding surface of the component and the surface to which the heat is applied. For a given component, accelerating the solder melting can only be achieved by using higher temperatures, which takes more time and poses more risk of misalignment due to thermal expansion, thermal drift, and other factors. Additionally, higher temperatures pose more risk of damage to the component.

Proposed technologies based on direct laser heating through a 'transparent' submount do not depend on conduction, but still depend on optical transmission of the full melting energy through the submount. To perform such heating, the size of the laser required and the risk that reflected light will cause either inefficient or undesirable heating is quite large. In particular, heating by such a method runs the risk of impinging light onto the laser-submount joint, thereby destroying the alignment of the laser on the submount.

Proposals based on embedded electrical heating are a further step towards maximally efficient use of the energy provided during bonding, by ensuring that nearly all the heat is delivered to the solder instead of the components. However, in all these prior art cases, the energy provided must still be the full energy of bonding. In all these cases, additional features must be designed into the bonding apparatus, such as chuck heaters, special heating lasers, pin probes, etc. As long as the full energy of bonding is provided, bonding will never be as fast or as safe as if only a fraction of the energy needed to be supplied. This is possible only if the remaining energy is stored within the solder itself in the form of chemical potential energy. As long as additional components are required for the bonding apparatus, it will never be as cost-effective or reliable as a simpler system in which only the basic alignment and bonding features are included.

Therefore, there is a need in the art for a faster, cheaper method of bonding a submount to a slider in a HAMR head, and a HAMR head produced thereof.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to a HAMR head and a method for fabrication thereof. The HAMR head has a write head with a waveguide extending therethrough. A laser diode is coupled to a submount that is bonded to the write head using an adhesion layer, a solder structure, and a self-propagating multilayer alloy stack.

Figure 1:
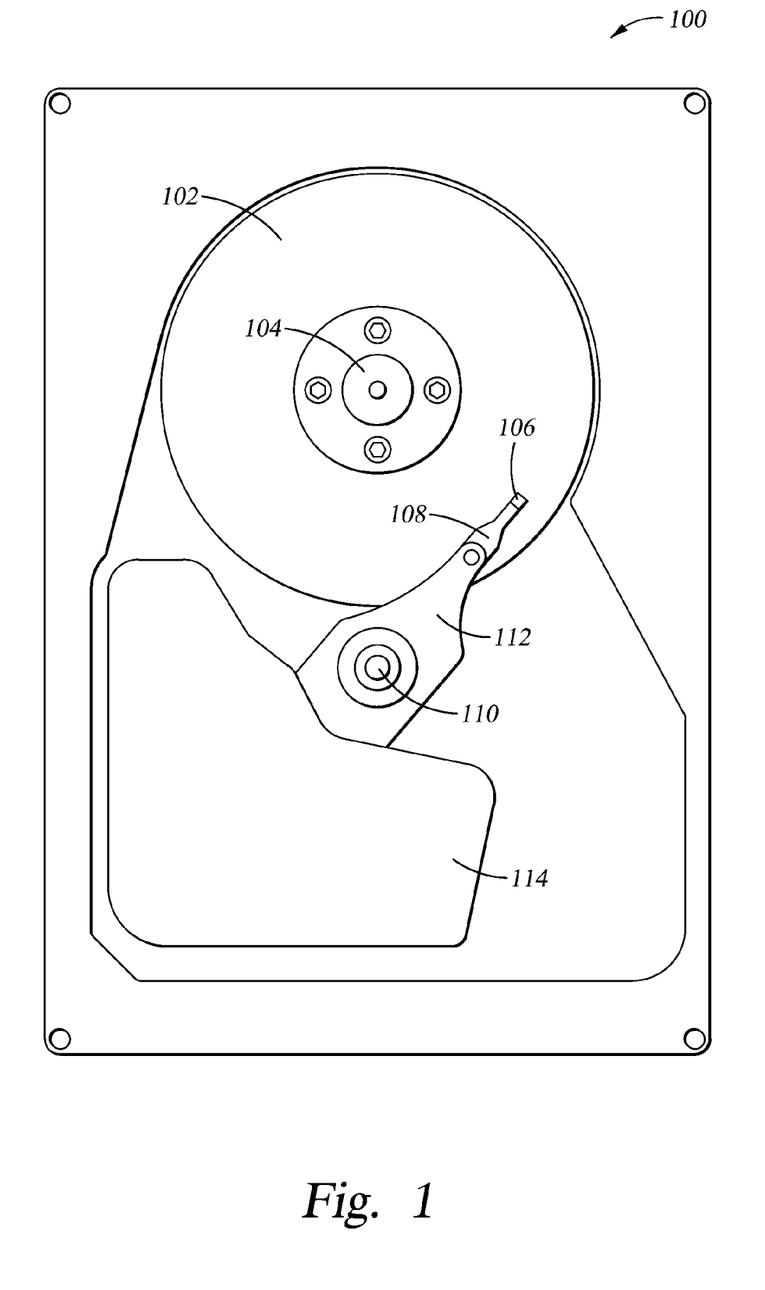
FIG. 1 is a schematic illustration of a hard disk drive (HDD) according to one embodiment.

FIG. 1 is a schematic illustration of a magnetic recording device, such as a hard disk drive (HDD) 100 according to one embodiment. The HDD 100 includes at least one magnetic recording medium, such as a disk 102 that is supported on a spindle 104. A motor causes the spindle 104, and hence the disk 102, to rotate. A magnetic head 106 that is mounted on a slider 108 moves over the disk 102 to read and write information from/to the disk 102. The head 106 rides on an air bearing above the disk 102 during read/write operations. The slider 108 is coupled to an actuator 110 by a suspension 112. The suspension 112 provides a slight spring force which biases the slider 108 towards the disk surface. Each actuator 110 is attached to an actuator means 114 that controls the movement of the head 106 relative to the disk 102.

Figure 2:
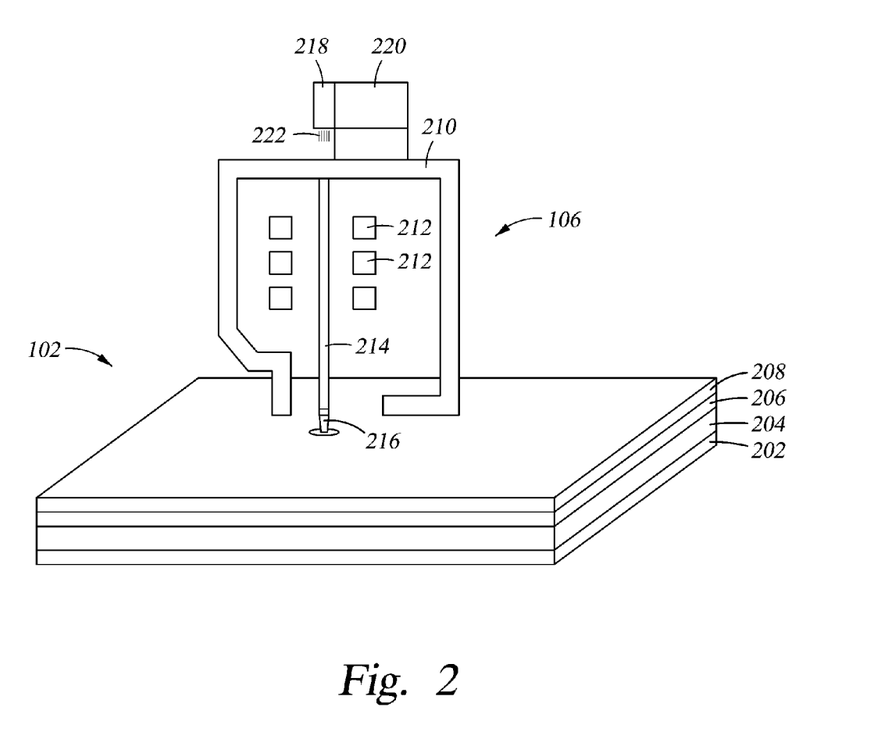
FIG. 2 is a schematic isometric illustration of a HAMR head.

FIG. 2 is a schematic isometric illustration of a HAMR head 106 adjacent a magnetic disk 102. The disk 102 includes a substrate 202, a soft underlayer 204, a nucleation layer 206 and a magnetic recording layer 208. The HAMR head 106 is a write head that includes a writer yoke 210 and writer coils 212. The coils 212 surround the waveguide 214. The waveguide 214 is adjacent the NFT 216 which is disposed at the ABS. A light source 218, such as a laser diode, is coupled to a submount 220 that is bonded to the head 106. The light source 218 emits light 222 that is directed to the waveguide 214.

As will be discussed below, the submount 220 is bonded to the head 106 using a technique known as "reactive bonding," in which an exothermic reaction between metal layers in the stack is used as an internal heat source for bonding. In reactive bonding, thin alternating layers of two reactant metals are deposited in the bonding zone, either alone or in combination with a solder structure. The reactant metals are 'ignited' by a small energy input and combine to form an intermetallic compound, along with the release of significant heat. The heat ignites the adjacent areas, and in this way the reaction is self-propagating until all the reactant metals have been consumed. In this way, only the energy of ignition need be supplied externally during bonding; the remaining energy for bonding exists within the stack as chemical potential energy. The advantage of reactive bonding, therefore, is not that reactive bonding eliminates the need for a special source of bonding energy (reactive bonding does not), but rather that reactive bonding significantly reduces the energy requirement, enabling smaller energy supplies that have less impact on bonder design/cost, and are less risky for alignment and reliability.

If the reactant metals comprise the entire stack, the intermetallic reaction product can effectively serve as the solder. If the reactant metals are deposited within or adjacent to a conventional solder structure, the intermetallic reaction is used only to provide the heat for melting the real solder, and the reaction product simply becomes one part of the final bond.

In one embodiment, the reactant metals comprise nickel and aluminum, forming nickel aluminides like NiAl or $Ni_3Al$. In other embodiments, the reactant metals include nickel and titanium, nickel and cobalt, and titanium and aluminum.

The amount of energy required to ignite the reaction depends on the materials, and on the morphologies of the materials. Lower energies are required to ignite morphologies with high specific surface area, such as thin films, while higher energies are needed to ignite thicker films. In this way, the ignition energy can be tuned via the thicknesses of the reactant metals to reach a balance between easy, low-cost ignition on demand during bonding, and the risk of accidental ignition before the desired point in the bonding process. Since the films used for HAMR bonding would be submicron in size, the total reaction energies would not be large enough to pose a risk to people or equipment; but accidental ignition before the bonding step would still be undesirable as it would render the solder unusable.

The ignition energy may be provided by heating components, impinging lasers on the reactants, or using heat from built-in heaters or electrical probes. However, it has been advantageously determined that using the light source 218 for the ignition energy will work.

The key feature of reactive bonding disclosed herein, is that the reactive bonding reduces the bonding energy requirement to a level that can be fulfilled by the light source 218 itself, which is already energized in an active alignment system. Thus all the energy required for bonding is available 'for free' when doing active alignment, requiring no further provision for bonding than what is already provided for alignment, i.e. no heaters in the chuck or embedded in the stack, no external lasers with or without tuned wavelengths, no pin probes, etc. This synergy eliminates the key drawback of both the reactive bonding prior art (i.e., that it still requires costly provisions to be made for delivering external energy for ignition), and the HAMR bonding prior art (i.e., that bonding is slow and risks damaging the components, due to the need for delivering the entire bonding energy through one or both of the components being bonded).

The concept of reactive bonding with built-in ignition could be implemented as follows. First, the chemical reaction is designed to meet the thermal requirements of the solder, then the location for the chemical reaction, i.e. where to deposit the chemical reactants relative to the solder, is determined. Finally, the ignition power available from the light source 218 during active alignment is used to define the thicknesses of the reactant layers.

The choice of reactants is determined primarily by energy density, i.e. the amount of heat produced by the reaction of a certain volume of the reactants. Higher energy density allows a smaller and less intrusive stack to be used. Reactants choice may also be modified based on reactant cost, reactant adhesion strength to the slider body, or reactant mechanical properties (for example, reactions that form brittle carbides and borides typically have very high energy density and reasonable cost, but should probably be avoided due to brittleness). Clearly, it is also desirable to use only reactions that produce intermetallics as reaction products—reactions such as thermite or combustion reactions also offer high energy density, but gaseous products are produced that would disrupt the alignment and bonding.

In one embodiment, the reactants are nickel and aluminum, which produces 7.15 $kJ/cm^3$ of reaction heat with no gaseous or ceramic products and using widely-available materials. The energy required for bonding is roughly equal to the heat of fusion of the solder, or of the materials in the solder structure. For an 80/20 Au/Sn solder structure, the heat of fusion is estimated from those of the component metals as 65.3 kJ/kg, or 0.96 $kJ/cm^3$. Thus, the volume ratio—i.e. thickness ratio—of the Ni/Al stack to the solder structure would be about 7.4:1. Providing a 20% margin for heat losses into the components, a target of about 6:1 may be achieved in one embodiment. Thus, if a solder structure is 3.5 microns thick, the corresponding Ni/Al stack would be about 600 nm. The nickel and aluminum could be arranged as a single bilayer, or as a multilayer stack to balance easy ignition against premature ignition. In one embodiment, the self-propagating multilayer alloying stack may comprise 12 bilayers with 50 nm thickness each, which is well within the capability of sputtering technology.

Figure 3A:
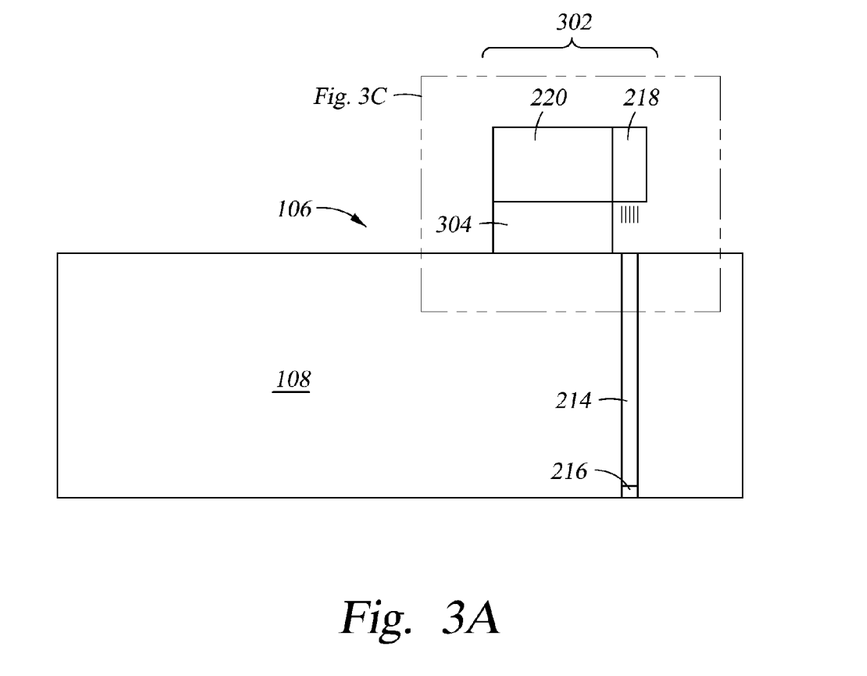
FIGS. 3A-3C are schematic illustration of a HAMR head according to one embodiment.
Figure 3B:
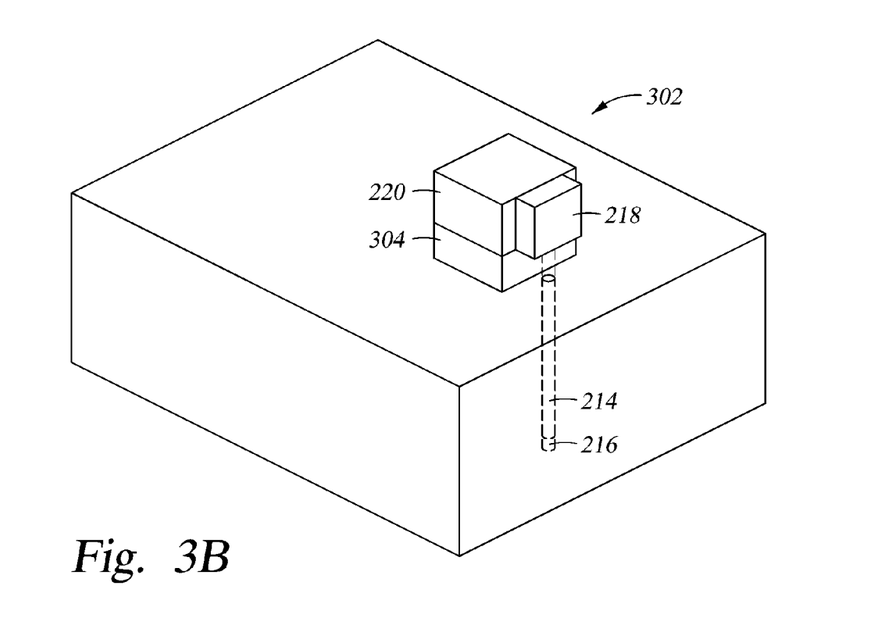
Figure 3C:
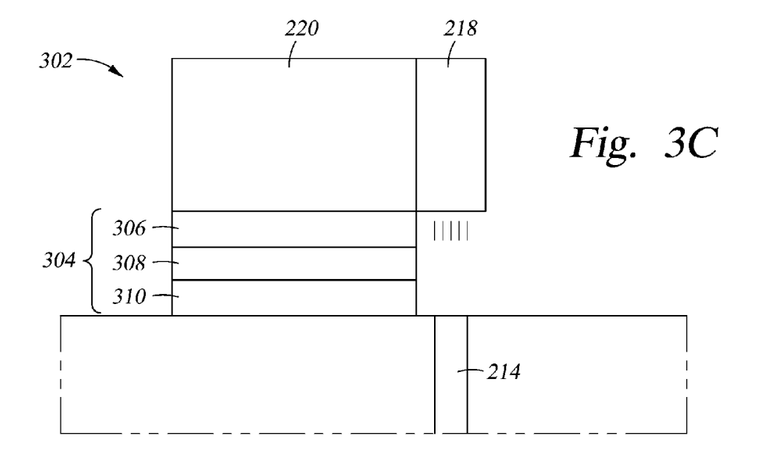

FIGS. 3A-3C are schematic illustrations of a HAMR head 106 according to one embodiment. The HAMR head 106 includes a slider 108 having a waveguide 214 and NFT 216, and a chip-on-submount assembly 302 having a light source 218 and submount 220. The submount 220 is coupled to the slider body by a bonding material 304. The bonding material 304 includes an adhesion layer 310, a solder structure 306 and a self-propagating, multilayer alloying stack 308 therebetween. It is to be understood that while the self-propagating, multilayer alloying stack 308 is shown between the solder structure 306 and adhesion layer 310, the self-propagating, multilayer alloying stack 308 may be disposed at other locations such as between the solder structure 306 and the submount 220 or between the adhesion layer 310 and the slider 108.

Figure 4:
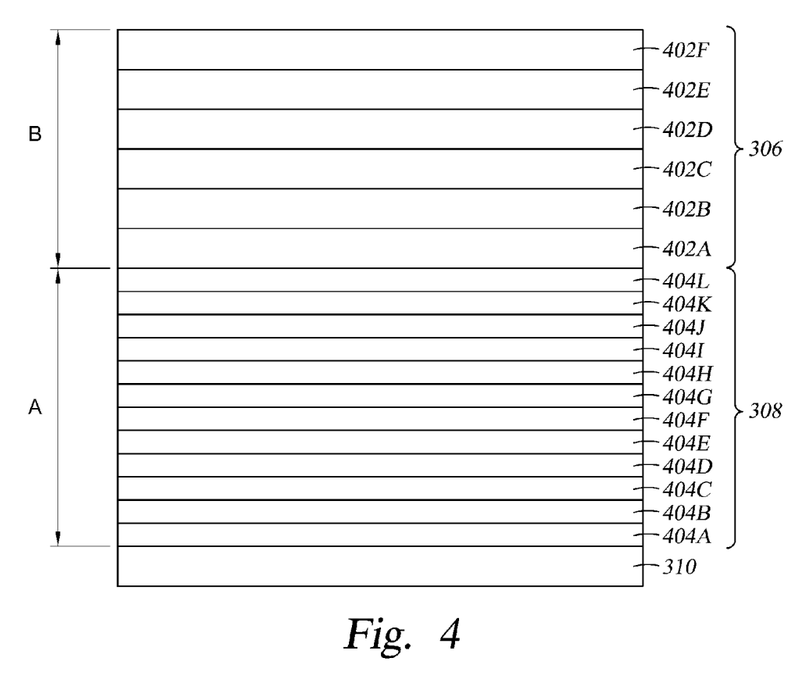
FIG. 4 is a schematic illustration of the solder structure, adhesion layer and self-propagating multilayer alloying stack according to one embodiment.

FIG. 4 is a schematic illustration of the solder structure 306, adhesive layer 310 and self-propagating multilayer alloying stack 308 according to one embodiment. In one embodiment, the adhesive layer 310 comprises gold. The solder structure 306 comprises multiple layers 402A-402F which are alternating layers that have a collective thickness shown by arrows "B". In one embodiment, the alternating layers 402A-402F may comprise alternating layers of gold and tin and have a collective thickness of between about 2.5 microns and about 3.1 microns. It is to be understood that while six layers have been shown, more or less layers for the solder structure 306 are contemplated.

The self-propagating, multilayer alloying stack 308 may also comprise a plurality of alternating layers 404A-404L. In one embodiment, the alternating layers 404A-404L include alternating layers of nickel and aluminum. In another embodiment, the alternating layers 404A-404L may comprise titanium and aluminum. In another embodiment, the total thickness of the alternating layers 404A-404L, represented by arrows "A", may be between about 0.3 microns and about 0.6 microns. It is to be understood that while twelve alternating layers have been shown, more or less layers may be present. Furthermore, in one embodiment, the topmost layer 404L of the alternating layer 404A-404L comprises aluminum while the bottommost layer 402A of the solder structure 306 comprises gold. In another embodiment, the bottommost layer 404A of the self-propagating, multilayer alloying stack 308 comprises nickel. In one embodiment, the self-propagating, multilayer alloying stack 308 comprises an even number of layers with a total number of alternating layers 404A-404L being greater than 2 and wherein each layer has a thickness of between about 40 nm and about 55 nm. In one embodiment, the self-propagating, multilayer alloying stack 308 has a thickness of between about ⅛ to about ⅙ a thickness of the solder structure 306. If materials other than nickel and aluminum are used for the self-propagating, multilayer alloying stack 308, the thickness may be as small as about ¼ the thickness of the solder structure 306.

Figure 5:
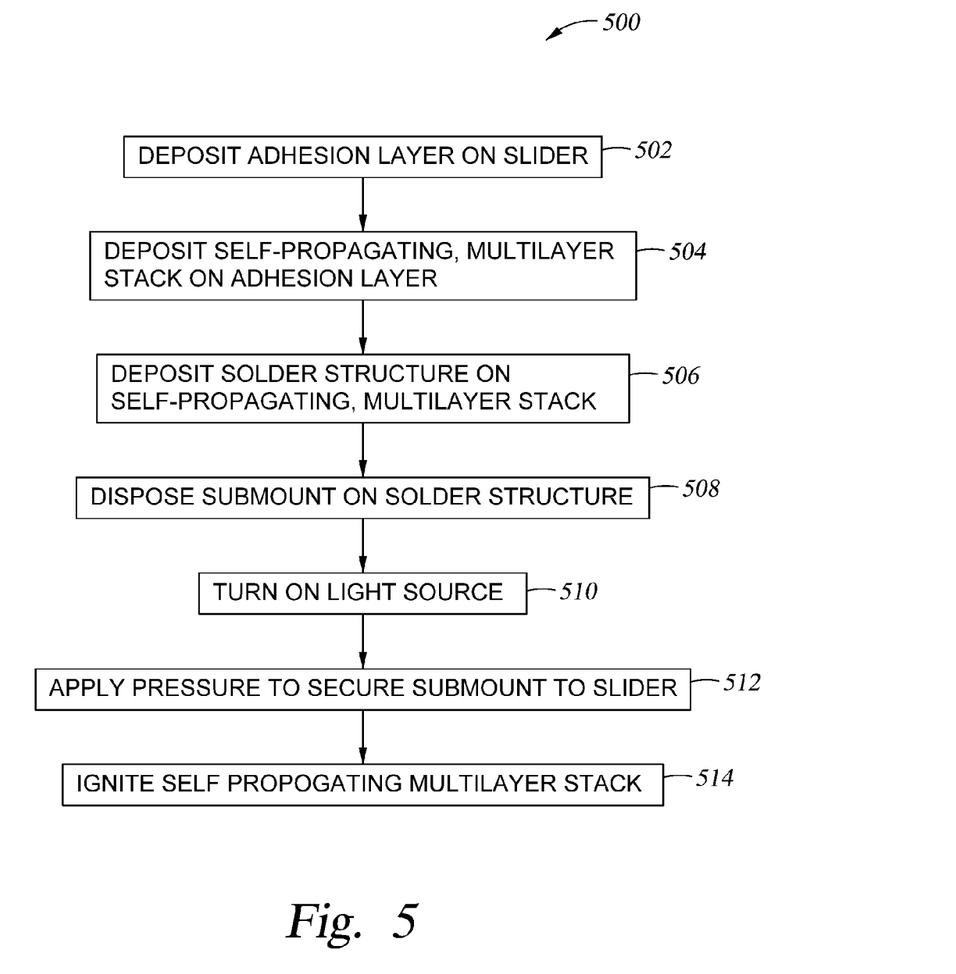
FIG. 5 is a flow chart showing the method of manufacturing a HAMR head according to one embodiment.

FIG. 5 is a flow chart 500 showing the method of manufacturing a HAMR head 106 according to one embodiment. As shown in box 502, the adhesion layer 310 is deposited on the slider 108. Thereafter, as shown in box 504, the self-propagating, multilayer alloying stack 308 is deposited on the adhesion layer 310. The self-propagating, multilayer alloying stack could be placed below, above, or between solder structure(s). In one embodiment, the self-propagating, multilayer alloying stack is disposed below the solder structure, since such a configuration would minimize exposure of the stack to oxygen from the atmosphere, which would degrade the energy density of the self-propagating, multilayer alloying stack. In one embodiment, the self-propagating multilayer stack has a thickness of 3.5 microns, comprises alternating layers of nickel and aluminum, and the solder structure comprises alternating layers of gold and tin.

As shown in box 506, the solder structure 306 is deposited on the self-propagating, multilayer alloying stack 308. The self-propagating, multilayer alloying stack 308 and the solder 306 stack may be deposited by deposition methods such as sputtering or evaporation. Furthermore, both depositions may occur in the same chamber. The submount 220 is then placed on the solder structure 306 as shown in box 508.

Once the self-propagating, multilayer alloying stack 308 and the solder structure 306 are deposited onto the slider 108, the chip on submount assembly 302 and the slider 108 are loaded to the bonding process. As shown in box 510, the first step of the bonding process is to turn on the light source 218 at a first power level and use its light to align the light source with the waveguide 214 over a first period of time, with the only requirement being to avoid extended high-temperature exposure that might anneal the stack and reduce the self-propagating, multilayer alloying stack's energy density.

As shown in box 512, once alignment has occurred, pressure is applied to secure the submount 220 to the slider 108. The laser power would be increased to a second power level for a second period of time. The heat generated by the laser would conduct through the submount 220 and slider 108 body into the self-propagating, multilayer alloying stack 308, and also from the waveguide 214 area through the slider 108 body into the self-propagating, multilayer alloying stack 308 and thus ignite the self-propagating, multilayer alloying stack 308 as shown in box 514. Which path the heat takes is not critical, so long as the heating rate of the self-propagating, multilayer alloying stack 308 is sufficient for ignition. Note that it is not necessary for the entire self-propagating, multilayer alloying stack 308 to be heated—since the reaction is self-sustaining, it is only necessary for ignition to occur in the area of the self-propagating, multilayer alloying stack 308 closest to the heat source, e.g. closest to the light source 218 or the waveguide 214. Thus, a small 'tab' or 'fuse' of the self-propagating, multilayer alloying stack can be extended closer to the waveguide if necessary to promote ignition. The pressure would be maintained for a third period of time after the second period of time to allow solidification.

The alignment power, the first power level, and duration, the first time period, would be determined by the needs of the active alignment process with the caveat being that the first power level and first time duration are sufficiently low to minimize the chance of premature ignition before alignment is achieved. The ignition power level, second power level, and duration, second time period, are material and thickness dependent. The third period of time would be determined by the rate of cooling and solidification. It is noteworthy that in this method, solidification occurs more quickly due to the fact that the submount and slider body are kept at lower temperatures compared to the prior art, contributing an unpredicted benefit in the form of even faster overall bond time.

It is to be understood that while the embodiments discussed herein relate to bonding a submount to a slider, it is to be understood that the bonding is applicable to other bonding as well and should not be limited to bonding a submount to a slider.

The benefits of using a self-propagating, multilayer alloying stack are as follows: eliminating the external energy sources such as heaters and lasers to enable faster and cheaper bonders; minimizing the side effects of external energy sources such as thermal expansions of chucks, components, optics, etc., thermal drift and temperature uniformity issues, and accidental reflow of the solder structure during heating; and reducing bond time by promoting faster solidification after bonding.

While the foregoing is directed to embodiments of the present disclosure, other and further embodiments of the disclosure may be devised without departing from the basic scope thereof, and the scope thereof is determined by the claims that follow.

The invention claimed is:

1. A magnetic recording head, comprising:
a slider body;
a write head coupled to the slider body, the write head having an air bearing surface and a second surface opposite the air bearing surface, the write head including:
a near field transducer disposed at the air bearing surface; and
a waveguide extending from the second surface to the near field transducer;
a submount coupled to the slider body;
a laser diode coupled to the submount and aligned with the waveguide such that light emitted from the laser diode is directed to the waveguide;
a solder structure coupled between the submount and the slider body;
an adhesion layer coupled between the slider body and the solder structure; and
a self-propagating, multilayer alloying stack disposed between one of the following:
the adhesion layer and the solder structure; or
the solder structure and the submount.

2. The magnetic recording head of claim 1, wherein the self-propagating, multilayer alloying stack comprises alternating layers of nickel and aluminum.

3. The magnetic recording head of claim 2, wherein the solder structure comprises alternating layers of gold and tin.

4. The magnetic recording head of claim 3, wherein the self-propagating, multilayer alloying stack has a thickness of between about ⅛ to about ⅙ a thickness of the solder structure.

5. The magnetic recording head of claim 4, wherein the adhesion layer comprises gold.

6. The magnetic recording head of claim 5, wherein a first layer of the self-propagating, multilayer alloying stack that is in contact with the adhesion layer comprises nickel.

7. The magnetic recording head of claim 6, wherein a topmost layer of the self-propagating, multilayer alloying stack that is in contact with the solder structure comprises aluminum.

8. The magnetic recording head of claim 1, wherein the self-propagating, multilayer alloying stack comprises an even number of layers with a total number of layers being greater than 2 and wherein each layer has a thickness of between about 40 nm and about 55 nm.

9. A hard disk drive, comprising:
a disk drive body having an enclosure;
a magnetic recording medium disposed within the enclosure;
a magnetic recording head disposed within the enclosure, the head comprising:
a slider body;
a write head coupled to the slider body, the write head having an air bearing surface and a second surface opposite the air bearing surface, the write head including:
a near field transducer disposed at the air bearing surface; and
a waveguide extending from the second surface to the near field transducer;
a submount coupled to the slider body;
a laser diode coupled to the submount and aligned with the waveguide such that light emitted from the laser diode is directed to the waveguide;
a solder structure coupled between the submount and the slider body;
an adhesion layer coupled between the slider body and the solder structure; and
a self-propagating, multilayer alloying stack disposed between one of the following:
the adhesion layer and the solder structure; or
the solder structure and the submount.

10. The hard disk drive of claim 9, wherein the self-propagating, multilayer alloying stack comprises alternating layers of nickel and aluminum.

11. The hard disk drive of claim 10, wherein the solder structure comprises alternating layer of gold and tin.

12. The hard disk drive of claim 11, wherein the self-propagating, multilayer alloying stack has a thickness of between about ⅛ to about ⅙ a thickness of the solder structure.

13. The hard disk drive of claim 12, wherein the adhesion layer comprises gold.

14. The hard disk drive of claim 13, wherein a first layer of the self-propagating, multilayer alloying stack that is in contact with the adhesion layer comprises nickel.

15. The hard disk drive of claim 14, wherein a topmost layer of the self-propagating, multilayer alloying stack that is in contact with the solder structure comprises aluminum.

16. The hard disk drive of claim 9, wherein the self-propagating, multilayer alloying stack comprises an even number of layers with a total number of layers being greater than 2 and wherein each layer has a thickness of between about 40 nm and about 55 nm.

17. A method of making a magnetic recording head, comprising:
depositing an adhesion layer over a slider having a write head coupled thereto, the write head having a waveguide extending therethrough;
depositing a self-propagating, multilayer alloying stack over the slider;
depositing a solder structure over the adhesion layer;
disposing a submount on the solder structure, the submount having a laser diode coupled thereto;
directing the laser towards the waveguide; and
igniting the self-propagating, multilayer alloying stack to bond the submount to the slider, wherein the self-propagating, multilayer alloying stack is disposed in one of the following locations:
between the adhesion layer and the solder structure; or
between the solder structure and the submount.

18. The method of claim 17, wherein directing the laser at the waveguide comprises:
directing the laser at the waveguide for a first period of time at a first power level to align the laser relative to the waveguide; and
directing the laser at the waveguide for a second period of time that is less than the first period of time and at a second power level that is greater than the first power level.

19. The method of claim 18, wherein the self-propagating, multilayer alloying stack comprises alternating layer of nickel and aluminum.

20. The method of claim 19, wherein the self-propagating, multilayer alloying stack has a thickness of between about ⅛ to about ⅙ a thickness of the solder structure.

* * * * *